(12) United States Patent
Lindsay et al.

(10) Patent No.: US 6,654,908 B1
(45) Date of Patent: Nov. 25, 2003

(54) METHOD FOR AND SYSTEM PRODUCING SHARED USAGE OF INTERCOMMUNICATION FABRIC ERROR LOGGING REGISTERS IN A MULTIPROCESSOR ENVIRONMENT

(75) Inventors: Dean T. Lindsay, Milpitas, CA (US); Robert D. Snyder, Ouistreham (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/563,019

(22) Filed: Apr. 29, 2000

(51) Int. Cl.[7] ................................................ G06F 11/00
(52) U.S. Cl. ........................ 714/20; 714/19; 707/6; 707/8; 707/9; 707/10
(58) Field of Search .................. 714/20, 19; 707/6, 707/8–10

(56) References Cited

U.S. PATENT DOCUMENTS

| | | | |
|---|---|---|---|
| 5,247,684 A | * | 9/1993 | Tavares et al. ............. 707/8 |
| 5,307,487 A | * | 4/1994 | Tavares et al. ............. 707/8 |
| 5,859,975 A | | 1/1999 | Brewer et al. ......... 395/200.43 |
| 5,941,996 A | * | 8/1999 | Smith et al. ................ 714/47 |
| 6,009,524 A | * | 12/1999 | Olarig et al. .............. 713/200 |
| 6,021,508 A | * | 2/2000 | Schmuck et al. ............ 714/4 |
| 6,049,801 A | | 4/2000 | Whitmyer, Jr. ............. 707/10 |
| 6,061,769 A | * | 5/2000 | Kapulka et al. ........... 711/162 |
| 6,393,419 B1 | * | 5/2002 | Novak et al. ............... 707/8 |
| 6,466,951 B1 | * | 10/2002 | Birkler et al. ............. 707/10 |
| 6,493,837 B1 | * | 12/2002 | Pang et al. ................ 714/45 |
| 6,516,314 B1 | * | 2/2003 | Birkler et al. ............. 707/8 |
| 2002/0124215 A1 | * | 9/2002 | Austen et al. ............. 714/57 |

OTHER PUBLICATIONS

Mano et al., Logic and Computer Design Fundamentals, 1997, Prentice–Hall, Inc., pp. 221–224.*

* cited by examiner

Primary Examiner—Robert Beausoliel
Assistant Examiner—Michael Maskulinski (57) ABSTRACT

A method and system allows multiple compute elements to independently read and clear error register logs, discard invalid data and ensure that a user receives information stored in error log registers. Error log registers are not cleared until its information is successfully retrieved by a compute element. A counter maintains a count of errors for which detailed error information has been lost.

18 Claims, 6 Drawing Sheets

FIG. 4B
FROM FIG. 4A

METHOD FOR AND SYSTEM PRODUCING SHARED USAGE OF INTERCOMMUNICATION FABRIC ERROR LOGGING REGISTERS IN A MULTIPROCESSOR ENVIRONMENT

TECHNICAL FIELD

This application relates in general to computer systems and more specifically to error registers shared and accessed by multiple requestors in a multiprocessor system.

BACKGROUND

Many computer systems use multiple processors to identify solutions faster or to address more complex problems. A typical, state of the art multiprocessor system is described, for example, in U.S. Pat. No. 6,049,801 entitled "Method of and Apparatus for Checking Cache Coherency in a Computer Architecture", and U.S. Pat. No. 5,859,975 entitled "Parallel Processing Computer System Having Shared Coherent Memory and Interconnections Utilizing Separate Unidirectional Request and Response Lines for Direct Communication of Using Crossbar Switching Device", both patents are assigned to the owner of the present invention, and are incorporated herein in their entirety. A multiprocessor computing system as described therein contains several compute elements each of which includes at least one processor and may include dedicated or shared distributed or central memory and input/output (I/O). These compute elements are connected to each other via an intercommunication fabric. The intercommunication fabric allows the various compute elements to exchange messages, share data, and coordinate processing. When an error occurs in this intercommunication fabric the error is detected and recorded in an error log register located in the intercommunication fabric.

It is important that the information contained in the error log register is forwarded to the user of the multiprocessor system. However, retrieval and display of this information is complicated by a number of factors. First, a dedicated error register reading compute element may not be practical because not all errors may be visible to each of the compute elements, and compute elements may be added or removed from the system during operation. Secondly, compute elements in a system are unaware of each other until they make contact via the intercommunication fabric and the error itself may disrupt or prevent communications between the various compute elements. Third, errors themselves occur with varying frequency and a specific error log only contains information concerning a limited number of errors, typically only a single error. Fourth, an error register is typically sized to contain information relating to a single error and successive error information is lost until the error register is read by a compute element and made ready to store subsequent error events. Each compute element is therefore interested in reporting errors as quickly as possible. Conflicts between competing compute elements to read and make error register content accessible are inevitable.

Normally the error log register cannot be read in a single access by any of the compute elements i.e. the operation is non-atomic, requiring several read cycles. A compute element must therefore retrieve all of the information in the error log register through multiple accesses. Normally a flag or a status register indicates that an error has been captured and stored in the error log register. Once the status register has been set, a compute element begins to access the information in the error log register and continues accessing that information until all of the error information has been retrieved. Once all of the information has been retrieved, the compute element then clears the status flag. However, in a multiprocessor environment wherein the error log register is shared, problems develop when compute elements compete to read the information stored in the error log register.

Such contention problems may come about as follows. If compute element A detects that the status flag is set, it begins to read the information from the error log register. Subsequently compute element B may also detect that the error flag is set. Compute element B would then begin to read the information stored in the error log register. Normally compute element A would complete its reading of the information stored in the error log register and clear the status register before compute element B has completed its reading of the error log register. Upon completion of compute element B's reading of the error log register, compute element B would notice the status register was no longer set and would discard the information. However, if a second error should occur after compute element A clears the flag and before compute element B completed its reading of the information in the error log register, compute element B's retrieved information would then contain part of the log of the first error and part of the log of the second error and would be invalid. Even though compute element B would check the status register to ensure the data is valid, the status register would have been reset by the second error and compute element B would believe that this information was valid. Compute element B obtains the invalid log because compute element A cleared the original error and a second error occurred before compute element B completed its retrieval of the error information. Compute element B would then pass invalid information to the user.

A prior method of solving this problem used a hardware semaphore to coordinate the retrieval of information of the error log registers between compute element A and compute element B. A hardware semaphore can be configured to ensure that only one compute element was accessing the information stored in the error log register at a time. However, the use of hardware semaphores have several disadvantages. One such disadvantage is that it is possible that after a compute element coordinates with a hardware semaphore to access an error log register, the compute element may begin to access the error log register and then encounter an error so that it cannot complete its access of the error log register. As long as that compute element retains control of the hardware semaphore, no other compute elements could then access the error log register in question. An additional mechanism would then be required to recover the lost semaphore so that the error log register information could be read and passed to the user.

A second method of coordinating multiple compute elements access of the error log register uses a communication mechanism between the processors to coordinate the reading and clearing of error log registers. In a multiple compute element environment, with the compute elements communicating via the intercommunication fabric, this methodology is impractical because the error log register resides in the intercommunication fabric and an error may make the intercommunication fabric itself unavailable to support communications between compute elements.

A need therefore exists for a method and system which allows multiple compute elements to read and independently clear error register logs, discard invalid data and which ensures that the user receives information received in error log registers. A further need exists for a protocol which will ensure that the error log register is not cleared until its information is successfully retrieved by a compute element and that does not allow erroneous data to be accessed and used.

SUMMARY OF THE INVENTION

These and other objects, features and technical advantages are achieved by a system and method which according to one aspect of the invention, provides a token to ensure that related data is not altered or cleared during a reading of the data by another process. The token can be atomically read and uniquely identifies a log entry to be read but which cannot be read atomically and evaluated for change. The token may be implemented in the form of a counter corresponding to the log entry. The log entry may only be cleared using the token as a key. Error data may be stored as the log entry using the token as the key so that only previously read data is overwritten. Reading may also be performed using the log so that intervening processes cannot alter the data. This method may be used to ensure that only valid copies of error data are obtained. According to a feature of the invention, the token may be various identifiers associated with the log entry including, for example, a count value, time stamp, digital signature, hash of the log entry, ECC, random number, or similar unique value atomically readable so as to ensure validity of nonatomically readable data.

According to another aspect of the invention, a method includes receiving first data, such as an indication of an event, e.g., such as an error or a request. In response to the event, a step of incrementing a first register containing a count value is performed. When a data status flag has a first condition, e.g., indicating that previously stored data has been processed and is no longer needed, the incremented count value is stored in a second register and the first data is stored in a memory such as an error event log. The flag may then be set to a second condition indicating, for example, that the just stored data is new and should not be overwritten prior to processing.

According to another aspect of the invention, values read from the second register before reading the error event log are compared to those read after reading the error event log so as to determine if the retrieved data spans more than one event and is therefore invalid and should be processed accordingly.

According to a feature of the invention, the method includes a step of setting the status flag to a second condition in response to said first data, for example indicating that new, unread data is stored in an error log. The data is read non-atomically from memory, that is, using more than one memory access so that intervening processes may have altered the data between the time reading is initiated and completed.

According to another feature of the invention, a method further includes steps of setting the status flag to a second (e.g., unread new data or "uncleared") condition in response to receipt of the first data. Reading of the data is accomplished over several read or memory access cycles, different portions of the first data being read each time from the memory. To verify validity of the totality of the data portions, values read from the second register are compared and, in response, the data stored in the memory is selectively processed. For example, unequal values would indicate that an intervening new error condition was logged, corrupting the information, so that the data should not be used. Conversely, a successful read of the data would result in resetting the flag back to said first condition so that new data overwriting the old could be stored.

According to another aspect of the invention, a method of reading a shared resource in a multiprocessor environment includes steps of detecting an event and incrementing an event count to provide an incremented event count. Old data stored in a memory is overwritten with new data related to the event in response to an indication that the old data has been processed. A reference count corresponding to the incremented event count is associated with the new data. A step of comparing the reference count with a prior copy of the reference count is performed to identify invalid data, in response, the new data is processed from the memory. Another step may provide an indication that the new data has been processed so that the processed data may be overwritten with new data. According to a feature of the invention, the processing includes copying the new data to another location. According to another feature of the invention, the event is an error condition and the new data comprises information about said error condition.

According to another aspect of the invention, a data processing system includes an event log and a flag indicating one of a cleared and uncleared condition of data stored in the event log. An event counter is configured to increment a value stored therein in response to occurrence of a predetermined event such as detection of an error, I/O request, interrupt, or other condition to be serviced or otherwise recognized. An event reference memory is configured to store the value stored in the event counter in response to the occurrence of the predetermined event when the flag indicates a cleared condition. Control circuitry stores information related to the event in the event log in response to the cleared condition of the flag and enables clearing of the flag when a value used to attempt the clear matches a current value of the event reference memory.

According to an aspect of a system according to the invention, a first processor performs two or more accesses of the event log, each time retrieving a different portion of data stored therein. Prior to use of the data, the processor compares the values read from the event reference memory before reading the event log with the value read from the event reference memory after reading the event log and, in response, selectively processes the retrieved data. Thus, for example, the processor discards or inhibits a use of the retrieved data in response to an incrementing of the event reference memory during the read process.

According to another feature of a system according to the invention, data status logic controls the flag to indicate an uncleared condition when the information related to the event is initially stored in the event log and to indicate a cleared condition when the data stored in the event log has been read.

According to another feature of a system according to the invention, the system includes at least one more, or a second processor, configured substantially as the first processor.

According to another feature of a system according to the invention, the system includes a crossbar device and a plurality of processing cells, each processing cell including a plurality of processors, local memory, coherency controller, and an interface to the crossbar device, the first and second processors included within the plurality of processors.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
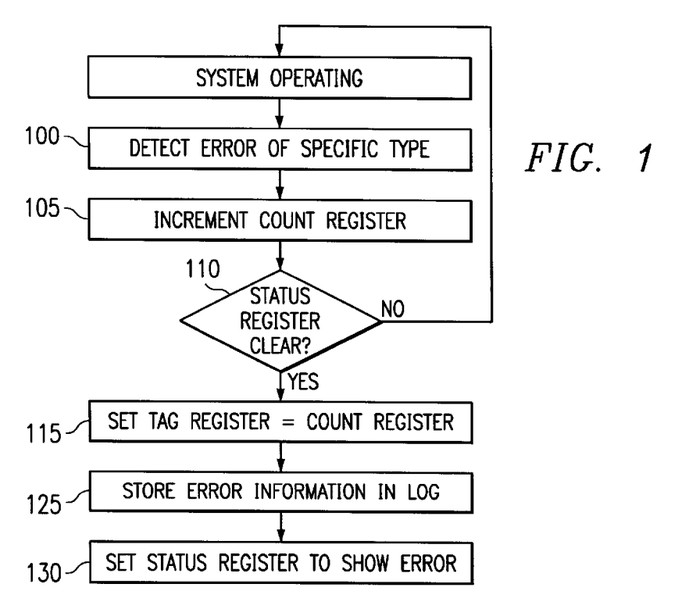
FIG. 1 is a flow diagram of a method for handling error logging.

FIG. 1 shows a high level flow diagram of the present invention. In Step 100 an error of a specific type is detected. This error may represent a communications fault or any of numerous other conditions mentioned by and/or reported by the system. In response to detection of the error, the count register is incremented for that specific type of error by 1 in Step 105. If the status register is determined to be clear at Step 110, indicating that the previously stored error information has already been read, then processing continues at Step 110 to overwrite the old information in the error log with the new error information. Old information in the tag register is also overwritten with the count register content. The steps taken when the status register is not clear and an additional error is detected will be further explained in FIG. 3. Thus, in Step 115, the tag register is set equal to the count register. The error information is recorded in the error log which is located in the intercommunication fabric in Step 125. The status register is set to show that an error condition occurred in Step 130. Details involving the clearing of the status register are explained in FIG. 6.

Figure 2:
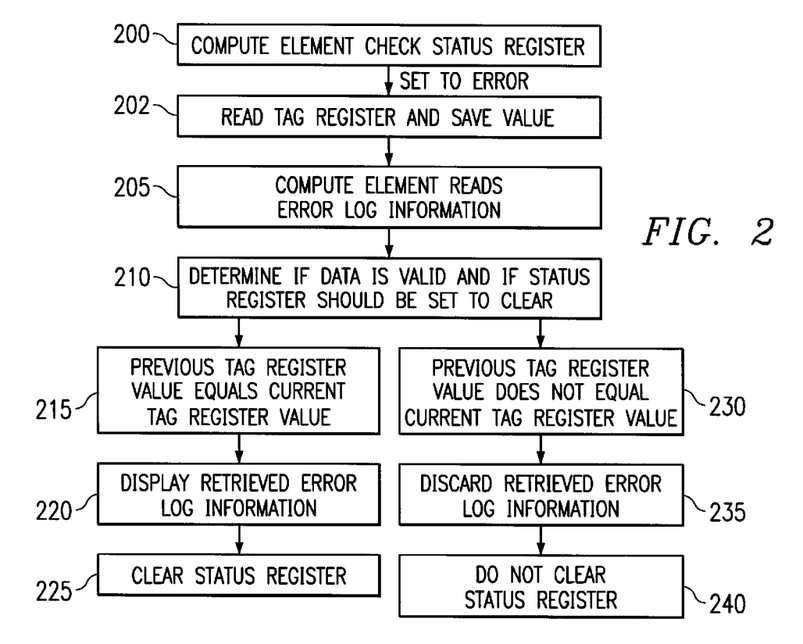
FIG. 2 is a high level flow diagram of a method of checking a status register by a compute element and validating the error log information retrieved.

FIG. 2 provides a high level description of a method of checking a status register by a compute element and validating the error log information retrieved. FIG. 2, compute elements periodically check the status register for an error condition at Step 200. Once a compute element finds an error status in the status register, the compute element reads the tag register at 202 and saves the value read for later comparison. The compute element also reads the information contained in the error log register at Step 205. Once the compute element reads the information in the error log register at Step 205, the compute element must determine if the information is valid at Step 210 by rereading the value in the tag register and comparing it to the saved value previously read from the tag register. If these two values are equal, processing continues at Step 215 where the compute element determines that it has obtained valid data, the data is provided to the user at Step 220, and the status register is cleared at Step 225. The status register is cleared by writing the tag register value to the error log clear register. Only clearing the status register when the supplied tag value matches the value stored in the tag register ensures that a subsequent error is not erroneously cleared when two computing elements clear at the same time.

Alternatively, if the current value of the tag register and the previous value of the tag register are not identical as shown in Step 230, the retrieved error log information is not valid and should be discarded at Step 235. Additionally, the status register should continue to display an error condition and therefore is not cleared as shown in Step 240. This comparison between the previous tag register contents and the current tag register contents ensures that error information is not lost before being successfully retrieved by at least one compute element.

Figure 3:
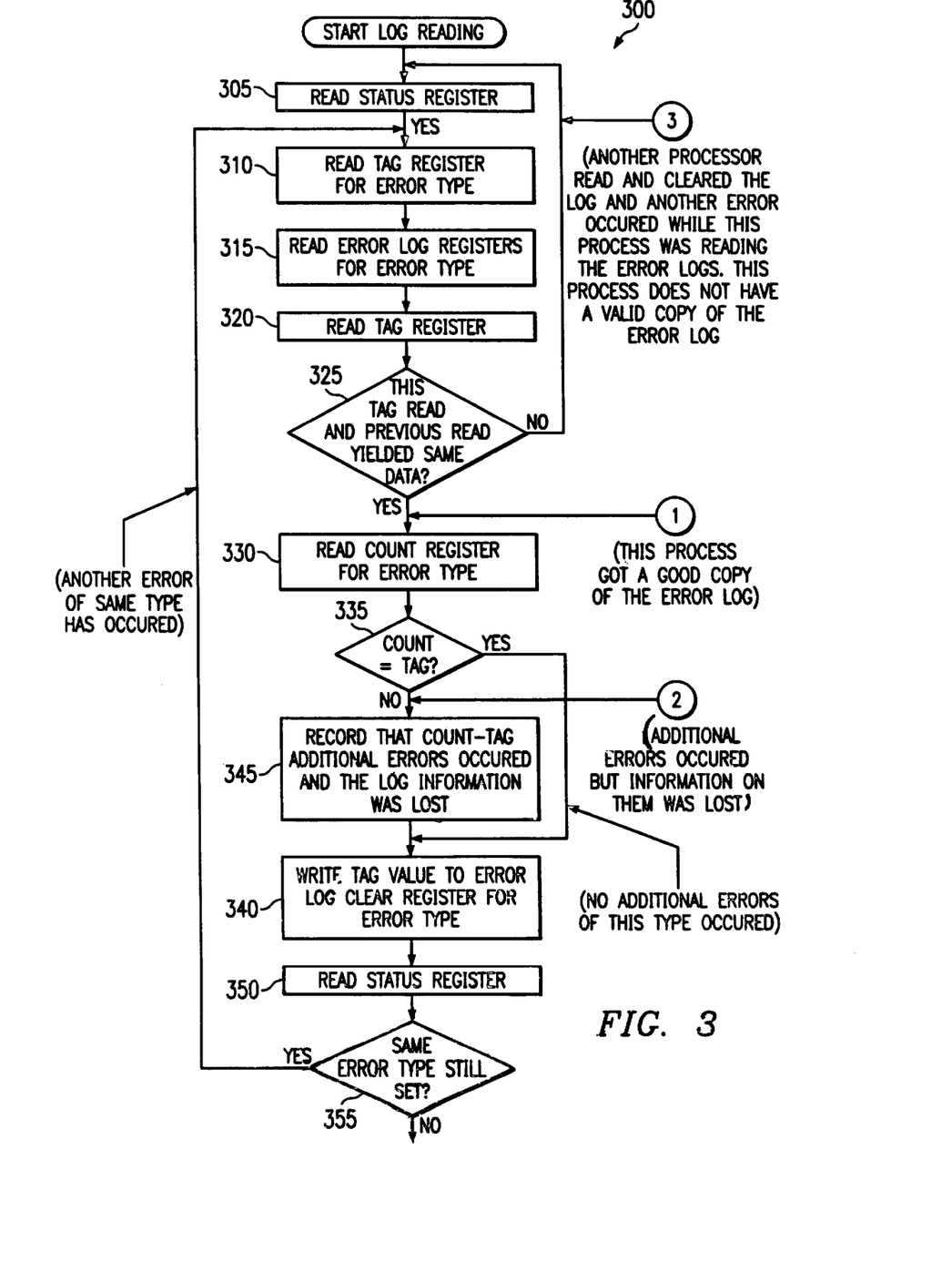
FIG. 3 is a more detailed flow diagram of a method using multiple registers to provide multiple compute elements access to common error log registers.

The flow diagram 300 of FIG. 3 shows additional details of the sequence of events included in the present invention including the relationship between the count register, the tag register and the status register. Referring again to FIG. 1, while the count register is increased each time an error is detected in Step 105, the tag register is only set equal to the count register when the status register is in a cleared condition in Step 115. Thus, referring now to FIG. 3, in Step 305 a compute element reads the status register associated with a specific error log register. If the status register is set to indicate an error, the compute element reads the tag register for the specific error type in Step 310. Once the compute element reads the tag register for the error in Step 310, the compute element then reads the error log register for the error type in Step 315. Reading an error log is a non-atomic process. In other words, the information stored in the error log register requires several compute element and/or memory access cycles for the compute element to acquire all the information contained therein. Once a compute element has completed reading the information contained in the error log register in Step 315, the compute element then reads the tag register a second time in Step 320. The compute element then compares the tag register read in Step 310 with the tag register read in Step 320 and compares the two values in Step 325. If the two values are not equal, the compute element does not contain a valid copy of the error log and the information is discarded. If the two values are equal, the compute element has received a valid copy of the information contained in the error log and proceeds to Step 330.

In Step 330, the compute element reads the count register for the error type. In Step 335, the compute element compares the count register with the tag register read previously. If the count register value is equal to the tag register value, no additional errors of this type have occurred since the error log and tag were stored. Thus, if the count register equals the tag register, processing continues so that the compute element writes the tag value to the error log clear register for the error type in Step 340 to clear the status register. Writing the tag value of the log which is to be cleared to the error log clear register is a necessary precaution to prevent accidental loss of error information when two computing elements contend to clear the same log. If compute element A clears the log and a subsequent error occurs before compute element B's clear (containing the same tag value) arrives, compute element B's clear tag value will not match the incremented tag value associated with the new log entry, and the new log entry will not be cleared. If in Step 335 the count register was not equal to the tag register, this indicates that an additional error occurred during the time required for the compute element to read the information in the error log register. In this case, the value count minus tag is recorded in Step 345 as the number of errors which occurred whose information is lost and the compute element again writes the tag value to the error log clear register for the error type in Step 340 to clear the status register. In Step 350 the compute element reads the status register and in Step 355 the compute element compares whether the stored value is the same error type that is currently set.

Referring back to Step 325 of FIG. 3, if the compute element's comparison between the tag register read in Step 310 with the tag register read in Step 320 indicates that the values are different, this indicates that the compute element does not have a valid copy of the error log and the information retrieved from the error log register should be discarded. One method in which this can happen is if compute element A read the status register in 305, and began accessing the error log register for the error type in Step 315. Subsequent to this access, compute element B read the status register in 305 and began an independent access of the error log register for the error type in Step 315. If compute element A and compute element B are equivalent, compute element A will complete its access of the error log register in Step 315 before compute element B completes its access of the information. In Step 325 when compute element A compares the tag register obtained in Step 310 with the tag register obtained in Step 320, compute element A will find these two values are identical. Because these values are identical compute element A will clear the status register which will allow the error log register to record a later error. If a subsequent error is stored in the error log register prior to compute element B's completion of its access of the error log register then compute element B's comparison in Step 325 of its tag register value from Step 310 and the second read tag register from 320 will show that the values are not identical. The values are not identical because the tag register was set equal to the count register resulting from the subsequent error. In this case, compute element B should discard its information contained in the error log register because the data represents portions of two different error logs and is invalid.

The use of three registers, namely, the count register, the error tag register and the error log clear register along with the status register, ensure that error information is not accidentally lost in a multiprocessor's element's system. The error count register is initialized at zero (0) upon system startup. The error count register increments by one (1) each time an error of the appropriate severity occurs, whether or not information about the error is logged. However, each time an error is logged into the error log register, the error tag register is only then set equal to the error count register corresponding to the error which is logged.

When the error tag register and the error count register remain the same during the time required for compute element to successfully access the information stored in the error log register (comparison in Step 325), this indicates that no additional errors occurred during the time required. In all cases in which the error tag register does not change, the information obtained by reading the error log register is valid and should be provided to the system and the user. Once the most recently stored error information is captured by at least one processor, the register can be configured to capture information associated with a subsequent error. If, however, the error tag register remains the same during the time required for a compute element to successfully access the information but the error count register has a larger value, this indicates that the information stored in the error log register was successfully read by the compute element but that another error of the specific type or the specific severity occurred during the access time (Step 345). The information read by the compute element from the error log register is valid but information from other errors has been lost. Since the compute element did successfully access the information contained in the error log register the information should be provided to the user and the error log register should be configured to accept subsequent error information (Step 340). If, in a third situation, the error tag register and the error count registers both increase during the time required for the compute element to access the information in the error log register another compute element has read a valid copy of the log and cleared the log during that access time and another subsequent error has occurred. In this case, another compute element has already obtained a valid copy of the information contained in the error log register. The information contained in the subsequent compute element's access of the error log register should be discarded (comparison in Step 325).

In order to allow subsequent error information to be recorded in the error log the error status bit in the error status register must be cleared. This is accomplished by writing the stored value of the tag read to step 320 into the log clear register at step 340 only after obtaining a valid copy of the error log (signified by reading the same tag value at 310 and 320). If the clear register is written with an incorrect tag the error logs are not cleared. This prevents inadvertent loss of critical error information.

Figure 4A:
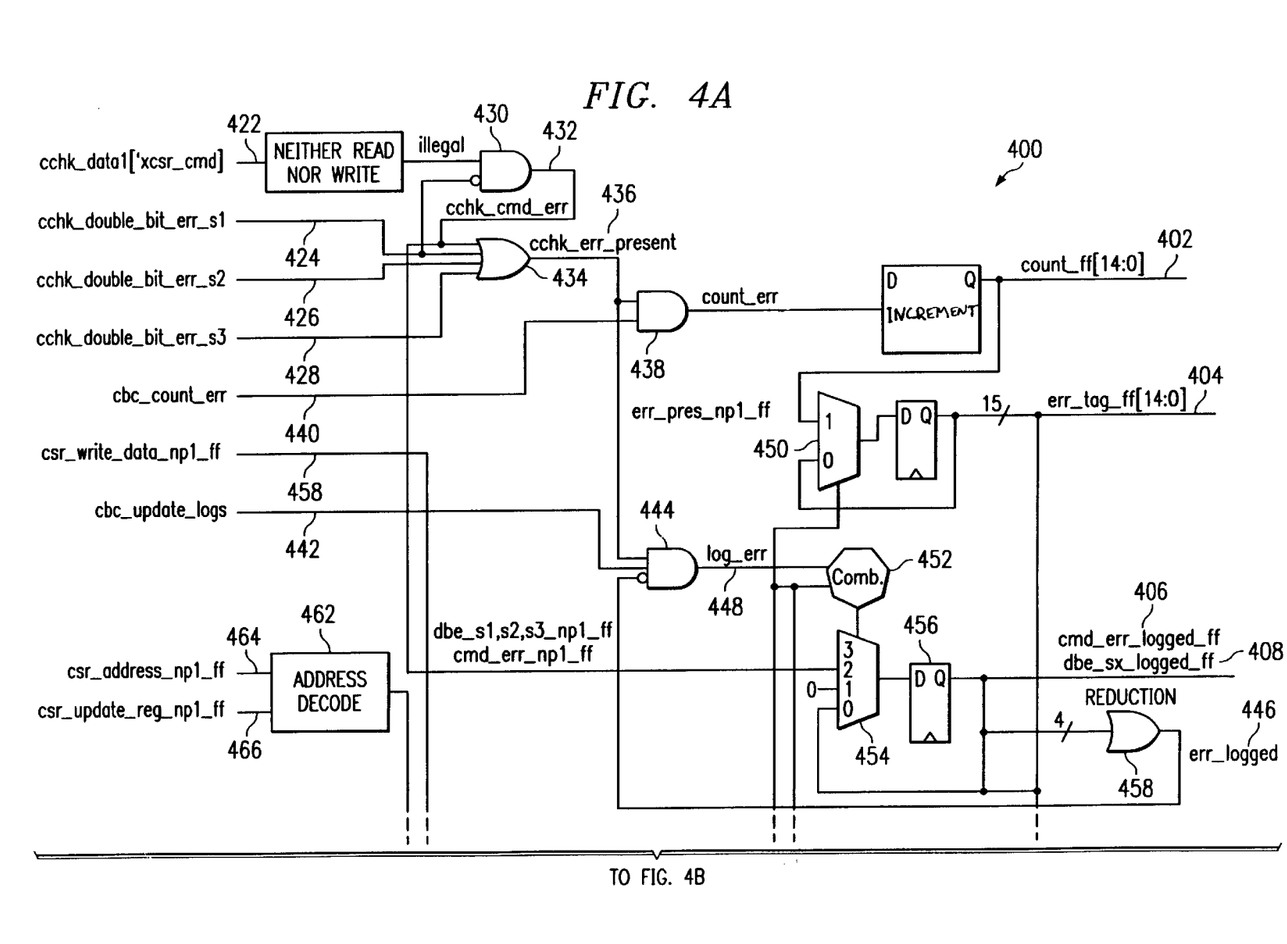
FIGS. 4A and 4B are a block diagram of a preferred embodiment of a mechanism to allow multiple compute elements to access common registers.
Figure 4B:
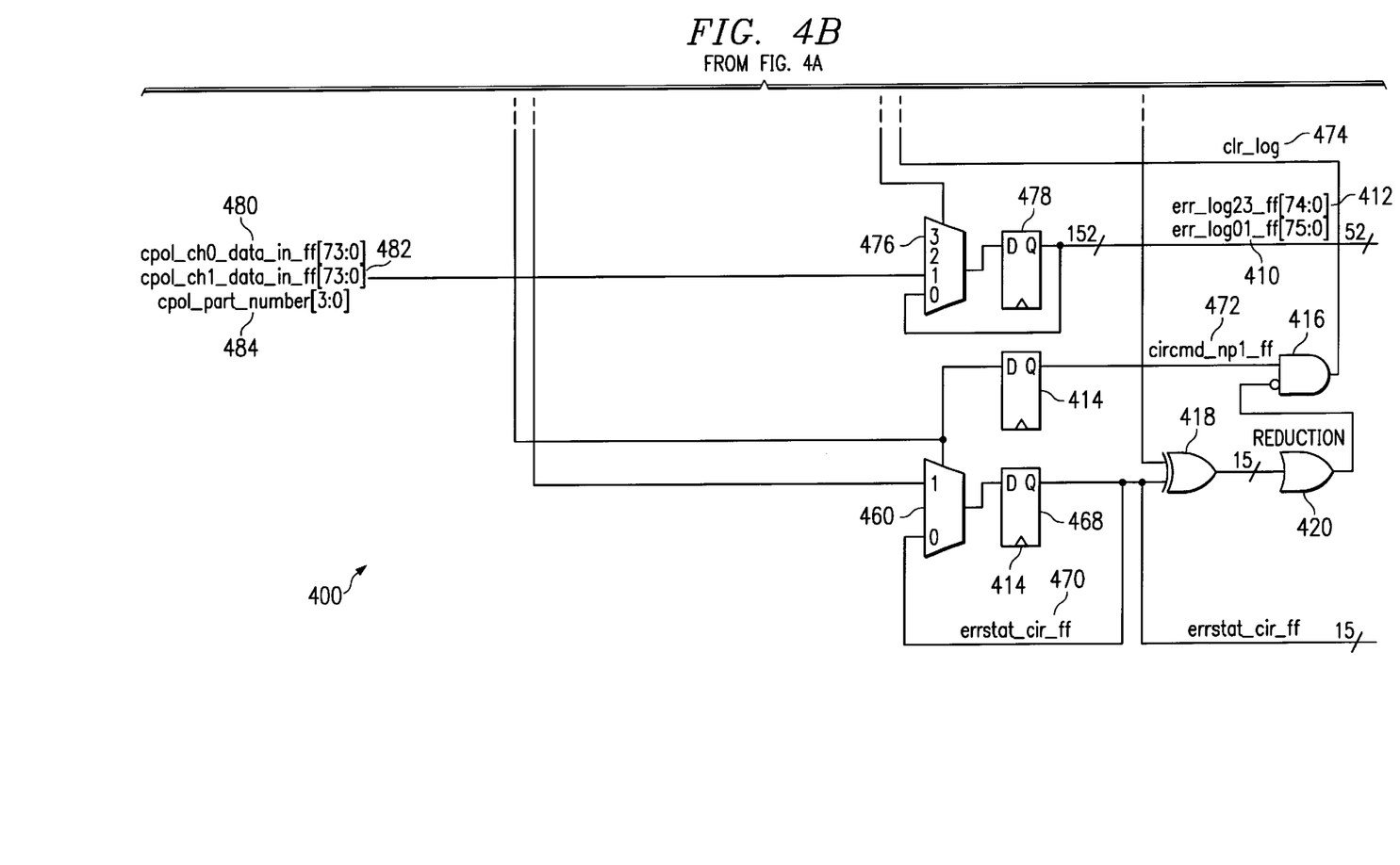

Referring now to system 400 of FIGS. 4A and 4B, a hardware implementation of the error log handling routines according to the present invention is shown. Referring now to FIG. 4, system 400 is a preferred embodiment of the present invention. The count register (count_ff) 402 is located on the upper right portion of the figure. The tag register (err_tag_ff) 404 is located below the count register. Also included are a command error log (cmd_err_logged) 406 and a DBE SX error log (dbe_sx_logged) 408. Command error log 406 and DBE SX error log each represent bits in the error status register 456 which relate to a tag and a count register.

Below the dbe_sx_logged 408 is the error log 01 (err_log01_ff) 410 and the error log 23 (err_log23_ff) 412. These logs contain information to indicate the exact nature of the detected error and provide 152 bits to record this information in. This log contains the actual error information that is intended to be gathered. Below these logs are a clearing register which consists of two flip flops 414, an AND gate 416, an exclusive OR gate 418, and a reduction OR gate 420. This clearing register allows the log to be cleared.

In the upper left-hand corner of FIG. 4A are four signals which come in from the left, cchk_data1 [xcsr_cmd] (422), cchk_double_bit_err_s1 (424), cchk_double_bit_err_s2 (426), and cchk_double_bit_err_s3 (428). These inputs are used by system 400 to detect the presence of certain types of errors which could occur. These are the four types of errors which are related to this set of error registers.

When one of these four types of errors occurs, an input to the OR gate 434 is asserted and the system determines that an error is present on cchk_err_present (436). This asserts an input to the count logic AND gate 438. On the left hand side of FIG. 4A, the control state machine that controls the logging of errors sends a signal (cbc_count_err) 440 which puts a pulse on the count logic AND gate 438. When these two inputs to the AND gate 438 are present, the count error signal will be assert and the count will be incremented.

When the logs are to be updated, the state machine asserts another signal cbc_update_logs 442 which will be present on one of the three inputs of AND gate 444. In order for this AND gate 444 to log an error, all three inputs must be a one. A second input to the AND gate 444 is the error present (cchk_err_present) 436 signal previously discussed. The third input to the AND gate 444 is the error logged (err_logged) signal 446. If an error has been logged and has not yet been read and cleared, the error logged signal will be a one and when inverted before being fed into the AND gate 444 will become a zero ensuring that the new error's information does not overwrite the unread data currently stored in the register. The output of the AND gate 444 is the log error (log_err) 448.

So for the log error signal to be present an error must be present, it must be time to update the logs and no current value can be logged in the register. When the log error signal 448 is present, it selects input one of MUX 450 and ensures that the count value 402 is read into the tag value 404.

Additionally, the log error signal is felt on the combitorial component 452, which in response to the present log error causes input 2 to be selected from the multiplexer 454. When input 2 is selected, the original error indication, any of cchk_cmd_err (432), cchk_double_bit_err_s1 (424), cchk_double_bit_err_s2 (426), or cchk_double_bit_err_s3 (428), is passed through the multiplexer 454 to the error status register 456.

Once the error is available at the error status register 456, the bit corresponding to the error is set and the reduction OR 458 has an output of one which is inverted on the input of the AND gate 444 to ensure that additional data is not written to the registers until a clear occurs. At this point, the circuit has incremented the count 402, set the tag 404 equal to the count, and has recorded the information concerning the error in the error logs 410 and 412.

If another error occurs at this point, the count error signal (count_ff) 402 is incremented as described above. But when the state machine sends the update log signal (cbc_update_logs) 442, the value of the log signal is felt on the AND gate 444, but err_logged signal 446 remains a one and is inverted before entering the AND gate 444 to ensure the AND gate does not allow the count to be recorded in the tag register. Additionally, the error information is not stored in the error log register 478, the values are not stored in error logs 410 and 412, nor are the bits changed in the error status register 456.

However, the updated count 402 gives an indication that an additional error has occurred and that the corresponding error data was not recorded. After a processor determines, using the error status, that an error has occurred, the processor reads the tag register 404. The processor than performs the necessary reads to access the error information stored in the err logs 410 & 412. After the processor acquires the error information it again reads the tag register 404, and if the two values read from the tag register are equal, the processor's copy of the log is complete and correct. In order to clear the log, the processor writes the value of the tag register to the command clear register. This is accomplished by placing the value of the tag register on csr_write_data_np1 input 458. This input is routed to the one input of multiplexer 460. The select input to multiplexer 460 is from the address decode box 462. When csr_address np1_ff 464 is equal to the address of the log clear register and csr_update_reg_np1_ff 466 occurs, the address decode's 462 output goes high (1) and is fed to the select of multiplexer 460. This select ensures the one (1) input on the multiplexer 460 is passed through which is the csr_write_data_np1_ff 458 value and is passed to the error stat clear register 468. The err stat_clr_ff 468 value and the tag value 404 are passed to the exclusive OR gate 418.

The exclusive OR gate 418 has the tag value 404 on its input and error stat clear flip flop (err stat_cir_ff) 470 on its second input. When the error stat clear register value matches the tag value, the output of the exclusive OR gates 418 all go zero and the output of the reduction OR gate 420 will be zero. This zero is passed and then inverted on the AND gate 416. The output to the AND gate 416 is fed to the combitorial block, and when the output of the AND gate is one the combitorial block will ensure input 1 of multiplexer 454 is passed. Input 1 is defined to be zero so zeros are written to the error status register 456. This enables error log information to be written into the error logs once again.

In the lower right hand corner of FIG. 4B, clrcmd_np1_ff 472 holds the one from the output of address decode 462 for a single clock cycle, creating a single clock cycle long pulse on the output of AND gate 416. This circuit ensures the clear command clr_log 474 is not present for longer than necessary.

Error log 01 (err_log01_ff) 410 and error log 23 (err_log23_ff) 412 contain information which indicates the exact nature of the error recorded. This information is obtained from multiplexer 476 and error information register 478. When all three inputs of AND gate 444 are ones, the select of multiplexer 476 allows the #1 input of multiplexer 476 to be passed to the error information register 478. Input 1 of multiplexer 476 is connected to cpo1_ch0_data_in_ff (480), cpo1_ch1_data_in_ff (482) and cpo1_port_number (484). These inputs contain detailed error information at the time of the error and are stored in the err_log_23_ff (412) and err_log01_ff (410) registers.

Figure 5:
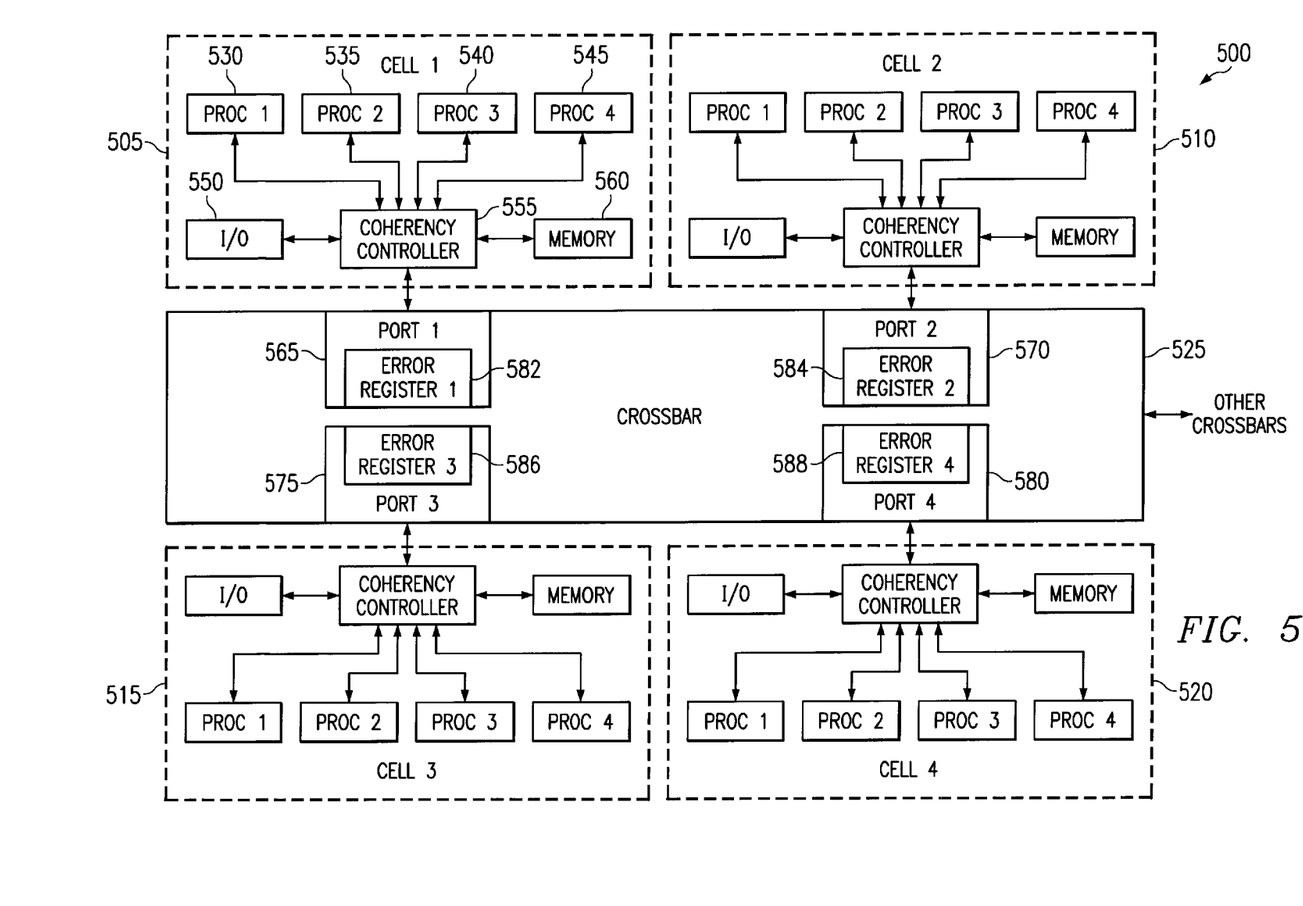
FIG. 5 is a block diagram of a node which includes error registers located in the crossbar.

System 500 of FIG. 5 shows a system embodying four instances of the present invention, and consists of cell 1 505, cell 2 510, cell 3 515 and cell 4 520 connected through crossbar 525. Within each cell resides one or more processors, and I/O, a coherency controller and a memory. Referring specifically to cell 1 505, cell 1 contains four processors, Processor 1 530, Processor 2 535, Processor 3 540 and Processor 4 545. Cell 1 505 also contains an I/O device 550, a coherency controller 555 and memory 560. Cell 2 510, cell 3 515 and cell 4 520 are similarly configured.

Connecting the cells in FIG. 5 is a crossbar 525. Within the crossbar 525 resides a port for connections with other system resources. Port 1 565 connects cell 1 505 to the crossbar 525. Similarly Port 2 570 allows cell 2 510 to connect to crossbar 525, Port 3 575 allows cell 3 515 to connect to the crossbar 525 and Port 4 580 allows cell 4 520 to connect to the crossbar 525. Within each port an error log register also exists. Specifically these are error register 582 within Port 1 565, error register 584 within Port 2 570, error register 586 within Port 3 575 and error register 588 within Port 4 580. These error registers are specific implementations according to an embodiment of the present invention described above, although other configurations may be substituted.

Figure 6:
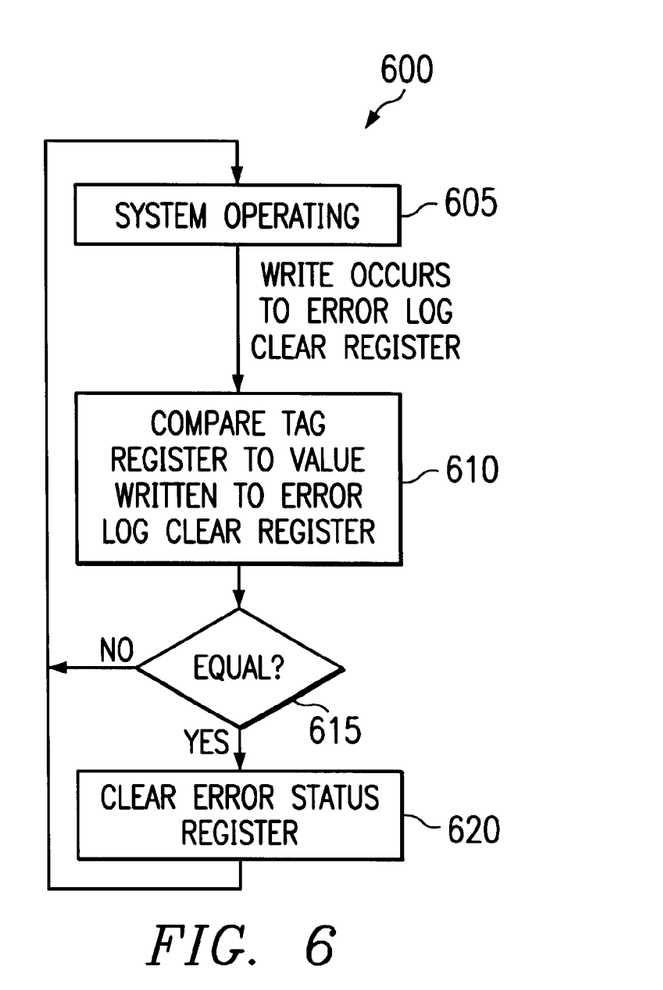
FIG. 6 is a flow diagram of a method for clearing the status register.

System 600 of FIG. 6 starts during normal system operation 605. When a write occurs to the error log clear register (Step 340 of FIG. 3), a comparison is made between the tag register and the value written in the error clear register in Step 610. If the two values are equal in Step 615, the error status register is cleared in Step 620. If the two values are not equal, the error status register is not cleared and normal system operation continues in Step 605.

Although the present invention and its advantages have been described in detail, it should be understood that various changes, substitutions and alterations can be made herein without departing from the spirit and scope of the invention as defined by the appended claims. For example, although the data access method and system has been described in terms of error logging, it is equally applicable to other shared data that is subject to updating and may be contained in limited, reused memory such as one or more registers. Thus, the system and method according to the invention is equally applicable to data such as interrupt vectors and flags, I/O requests, and other data that is shared, accessed and/or serviced by multiple processors. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising the steps of:
   providing a token which can be atomically read and which uniquely identifies a log entry which cannot be atomically read and evaluated for change; and
   clearing said log entry using said token as a key;
   wherein said token includes an indication of a status of said log entry.

2. The method according to claim 1 further comprising the steps of:
   storing error data as said log entry and updating said token to correspond to said error data.

3. The method according to claim 2 further comprising the steps of:
   reading said error data using said token to validate said error data.

4. The method according to claim 1 wherein said token includes an indication of an ordinality of said log entry.

5. The method according to claim 1 further comprising ensuring only valid copies of error data are obtained corresponding to said log entry and inhibiting clearing of unrecorded data corresponding to said log entry.

6. The method according to claim 1 further comprising a step of forming a digital signature of said log entry to create said token.

7. The method according to claim 1 further comprising a step of hashing said log entry to create said token.

8. A method of accessing data, comprising the steps of:
   receiving first data;
   incrementing a first register containing a count value in response to said first data to provide an incremented count value;
   storing, in response to a first condition of a flag, (i) said incremented count value in a second register and (ii) said first data in a memory;
   setting said flag to a second condition in response to said first data;
   reading, on plural occasions, different portions of said first data from said memory;
   comparing values stored in said second register prior to and after said reading step and, in response, selectively processing said first data stored in said memory; and
   in response to said comparing step resetting said flag back to said first condition only if the value read from said second register for use in comparing step matches the value stored in said second register.

9. The method according to claim 8, further comprising a step of setting said flag to a second condition in response to said first data.

10. The method according to claim 8, further comprising the steps of:
    reading a first data value stored in said second register;
    reading said first data from said memory;
    reading a second data value stored in said second register and comparing said first and second data values.

11. The method according to claim 10 further comprising a step of processing said first data in response to a result of said comparing step.

12. The method according to claim 10, further comprising the step of resetting a condition of said flag only if said second data value matches the first data value.

13. The method according to claim 8, further comprising a plurality of steps of reading portions of said first data from said memory and steps of comparing values read from said second register and, in response, selectively processing said first data.

14. The method according to claim 8, further comprising the steps of:
    detecting a non-equivalence of said values and, in response, inhibiting a processing of said first data stored in said memory.

15. The method according to claim 8 wherein said first data includes error information and said count value includes a number of error events detected.

16. The method of reading a shared resource in a multiprocessor environment, comprising the steps of:
    detecting an event;
    incrementing an event count to provide an incremented event count;
    overwriting old data stored in a memory with new data related to said event in response to an indication that said old data has been processed;
    associating, with said new data related to said event, a reference count corresponding to said incremented event count in response to said indication that said old data has been processed;
    storing said reference count;
    reading said new data from said memory;
    reading a new copy of said reference count subsequent to said step of reading said new data;
    comparing said new copy with said stored copy of said reference count and, in response, selectively processing said new data from said memory.

17. The method according to claim 16 further comprising a step of providing an indication that said new data has been processed.

18. The method according to claim 17 further comprising a step of indicating that said new data has been processed by supplying a previously read value of the reference count matching the current value of the reference count.

* * * * *